United States Patent
Hill et al.

(10) Patent No.: US 9,648,695 B2
(45) Date of Patent: May 9, 2017

(54) LIGHTING APPARATUS FOR USE WITH CONTROLLED CURRENT DRIVERS

(71) Applicant: Cree, Inc., Durham, NC (US)

(72) Inventors: Shawn Hill, Raleigh, NC (US); Everett Bradford, Apex, NC (US)

(73) Assignee: Cree, Inc., Durham, NC (US)

( * ) Notice: Subject to any disclaimer, the term of this patent is extended or adjusted under 35 U.S.C. 154(b) by 706 days.

(21) Appl. No.: 13/955,689

(22) Filed: Jul. 31, 2013

(65) Prior Publication Data
US 2015/0035443 A1    Feb. 5, 2015

(51) Int. Cl.
*H05B 37/02* (2006.01)
*H05B 33/08* (2006.01)

(52) U.S. Cl.
CPC ..... *H05B 33/0857* (2013.01); *H05B 33/0815* (2013.01); *H05B 33/0827* (2013.01); *Y02B 20/347* (2013.01)

(58) Field of Classification Search
CPC ............ H05B 33/0842; H05B 33/0857; H05B 33/0815; H05B 33/0839
USPC ....................... 315/185 R, 291, 307
See application file for complete search history.

(56) References Cited

U.S. PATENT DOCUMENTS

| | | | | |
|---|---|---|---|---|
| 7,642,725 B2* | 1/2010 | Cusinato | ............ | H05B 33/0815 315/185 S |
| 7,847,486 B2* | 12/2010 | Ng | ............ | H05B 33/0812 315/119 |
| 8,118,456 B2* | 2/2012 | Reed | ............ | F21S 8/032 362/200 |
| 2008/0116818 A1* | 5/2008 | Shteynberg et al. | ......... | 315/192 |
| 2012/0153844 A1* | 6/2012 | Chobot | ............ | 315/185 R |
| 2012/0306375 A1* | 12/2012 | van de Ven | ............ | 315/122 |
| 2012/0306399 A1* | 12/2012 | Bazzani | ............ | H05B 33/086 315/210 |
| 2013/0002219 A1* | 1/2013 | D'Angelo | ............ | H05B 33/0812 323/282 |
| 2013/0162152 A1* | 6/2013 | Lee | ............ | H05B 33/0827 315/192 |

OTHER PUBLICATIONS

Cree, Inc.,LMD300 LED Module Drivers, retrieved at url: http://www.cree.com/~/media/Files/Cree/LED%20Components%20and%20Modules/Drivers/LMD_300.pdf Dec. 31, 2013, Copyright 2013, 11 pages.

Cree, Inc.,LMH2 LED Module: Unrivaled Efficacy, Light Quality and Affordability, retrieved at url: http://cree.com/led-components-and-modules/products/modules/non-inteprated/lmh2 Jul. 31, 2013, Copyright 2013, 11 pages.

Diodes, Inc., AL8807 High Efficiency Low EMI 36V 1A Buck LED Drive, retrieved at url: http://www.diodes.com/datasheets/AL8807.pdf Dec. 31, 2013, Copyright Mar. 2013.

* cited by examiner

*Primary Examiner* — Thuy Vinh Tran
(74) *Attorney, Agent, or Firm* — Coats & Bennett, PLLC (57) ABSTRACT

An apparatus includes a bus configured to be coupled to a controlled current source and at least one light emitting device coupled to the bus. The apparatus further includes a voltage regulator circuit configured to regulate a voltage at the bus and a current regulator circuit configured to control a current through the at least one light emitting device. In some embodiments, the current regulator circuit is used to control a color output of the apparatus.

20 Claims, 11 Drawing Sheets

LIGHTING APPARATUS FOR USE WITH CONTROLLED CURRENT DRIVERS

FIELD

The present inventive subject matter relates to lighting apparatus and methods and, more particularly, to solid-state lighting apparatus and methods.

BACKGROUND

Solid-state lighting arrays are used for a number of lighting applications. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are commonly used in lighting fixtures, including task lights, recessed light fixtures, ceiling mounted troffers and the like. Solid-state lighting panels are also commonly used as backlights for small liquid crystal display (LCD) screens, such as LCD display screens used in portable electronic devices, and for larger displays, such as LCD television displays.

Solid-state lighting devices may have modular arrangements. For example, modular lighting components, such as LED lighting modules and driver modules, may be interconnected in a variety of different fixture arrangements. Driver modules used in such fixtures often include controlled-current power sources that are configured to provide a controlled current to drive one or more LEDs of an attached LED module. The current provided by the driver module may vary in response to a dimming input, such as a phase cut in the power provided to the driver module from a dimmer or a separate analog or digital dimming signal (e.g., DALI, DMX, 0-10V, 1-10V, etc.), such that light output of the LED module varies with the dimming input.

SUMMARY

Some embodiments provide an apparatus including a bus configured to be coupled to a controlled current source and at least one light emitting device coupled to the bus. The apparatus further includes a voltage regulator circuit configured to regulate a voltage at the bus and a current regulator circuit configured to control a current through the at least one light emitting device.

In some embodiments, the voltage regulator circuit may be configured to control the current regulator circuit to support regulation of the voltage at the bus. In some embodiments, the voltage regulator circuit may further include a current sink circuit coupled to the bus.

The current regulator circuit may include a buck current regulator. In further embodiments, the voltage regulator circuit may include at least one string of LEDs coupled to the bus.

According to some embodiments, the current regulator circuit may be configured to control the current through the at least one light emitting device responsive to a current output of the controlled current source to vary a color of a lighting output of the apparatus as the current output changes. The at least one light emitting device may include first and second strings of LEDs configured to be coupled in parallel to the bus.

Some embodiments of the inventive subject matter provide an apparatus including a bus configured to be coupled to a controlled current source and at least one first LED, such as a fixed string of LEDs, coupled to the bus and configured to regulate a voltage thereat. The apparatus further includes at least one second LED configured to be coupled to the bus in parallel with the at least one first LED. A current regulator circuit is configured to control a current through the at least one second LED. The current regulator circuit may be configured to control the current through the at least one second LED responsive to a current output level of the controlled current source. The current regulator circuit may be configured to vary a color of a light output of the apparatus as the current output level of the controlled current source varies. The current regulator circuit may include a buck current regulator.

In some embodiments, the at least one first LED may include at least one LED configured to produce a first color and at least one LED configured to produce a second color. The at least one second LED may include at least one LED configured to produce one of the first and second colors. For example, the first color may include blue-shifted yellow and the second color may include red.

In some embodiments, the at least one first LED includes a string of LEDs. In further embodiments, the at least one second LEDs includes a string of LEDs.

The apparatus may further include at least one third LED coupled to the bus. The current regulator circuit may be configured to individually control currents through respective ones of the at least one second LED and the at least one third LED. The current regulator circuit may include respective buck current regulators configured to control respective currents through the at least one second LED and the at least one third LED. The at least one first LED may include at least one LED configured to produce a first color and at least one LED configured to produce a second color, the at least one second LED may include at least one LED configured to produce the first color and the at least one third LED may include at least one LED configured to produce the second color. The first color may include blue-shifted yellow and the second color may include red.

Still further embodiments of the inventive subject matter provide an apparatus including a bus configured to be coupled to a controlled current source, at least one first LED and at least one least one second LED configured to be coupled in parallel to the bus. A regulator circuit is configured to individually control currents through respective ones of the at least one first LED and the at least one second LED to regulate a voltage of the bus and control a color of a light output of the apparatus. The regulator circuit may further include a current sink circuit coupled to the bus.

The at least one first LED and the at least one second LED may be configured to provide first and second color components of the light output of the apparatus. The regulator circuit may include respective buck current regulators configured to control currents through respective ones of the at least one first LED and the at least one second LED. The regulator circuit may further include a control circuit configured to control the buck current regulators responsive to a voltage of the bus and an output current of the controlled current source.

Still further embodiments provide an apparatus comprising a bus configured to be coupled to a controlled current source, at least one light emitting device coupled to the bus and a voltage regulator circuit configured to regulate a voltage at the bus. In some embodiments, the voltage regulator may include at least one LED coupled to the bus. In further embodiments, the voltage regulator circuit comprises a current regulator circuit configured to regulate a current through the at least one light emitting device.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The present inventive subject matter may further relate to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

Figure 1:
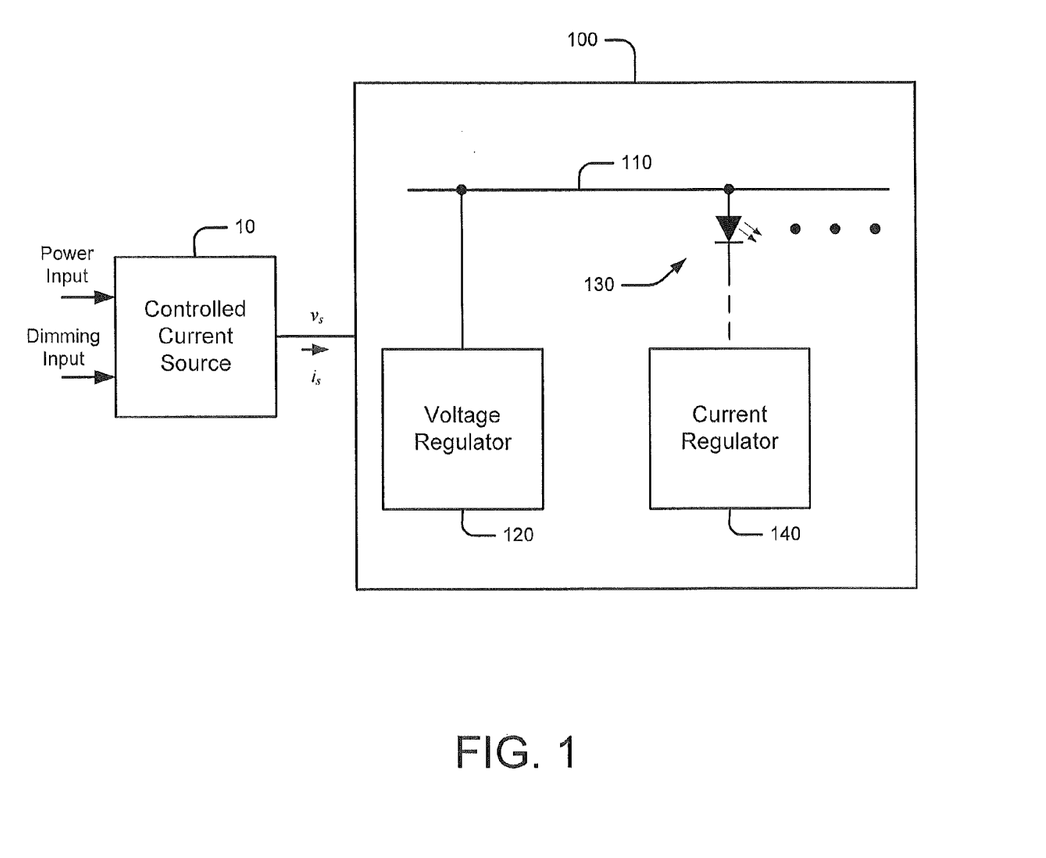
FIG. 1 is a schematic diagram illustrating lighting apparatus according to some embodiments.

FIG. 1 illustrates a lighting apparatus 100 according to some embodiments. The lighting apparatus 100 is configured to be coupled to a controlled-current source 10, e.g., an LED driver as commonly used in modular lighting systems. The controlled-current source 10 produces a regulated output current $i_s$ that may be used to drive LEDs or other light emitting devices. The output current $i_s$ may be maintained at a desired level by varying an output voltage $v_s$ produced by the source 10. It will be appreciated that the current-controlled source 10 may be connected to a power source, such as an AC power source, and may receive a power input therefrom. The current-controlled source 10 may also receive a dimming control input, and may vary the output current $i_s$ in response to the dimming input. The dimming control input may be, for example, a phase cut applied to the power input from the AC power source or a separate dimming input signal, such as an analog, digital and/or pulse-width modulated signal (e.g., DALI, DMX, 0-10V, 1-10V, etc.) provided in addition to the power input.

The lighting apparatus 100 includes a bus 110 that is configured to be directly or indirectly coupled to the controlled current source 10 to receive power therefrom. A voltage regulator circuit 120 is coupled to the bus 110 and configured to regulate a voltage of the bus 110. At least one light emitting device, e.g., at least one LED 130, is coupled to the bus 110. A current regulator circuit 140 is configured to regulate a current through the at least one LED 130. In some embodiments, the current regulator circuit 140 may be used to control a light output of the lighting apparatus 100 responsive to the output current $i_s$ and/or the output voltage $v_s$. The light output control may include, for example, intensity and/or color control.

For example, color control may occur responsive to the output current $i_s$ produced by the controlled current source 10, such that, for example, a color characteristic (e.g., a color temperature) of light produced by the lighting apparatus 100 varies with a dimming input applied to the controlled current source 10. Such techniques may be used, for example, to cause the color of the light output of the lighting apparatus 100 to follow a desired locus in a color space. In this manner, the lighting apparatus 100 may, for example, approximately track a black body radiator locus to approximate color behavior of a conventional incandescent lamp in response to the dimming input, similar to dimming performance described in a U.S. Patent Application entitled Systems and Methods for Controlling Solid State Lighting Devices and Lighting Apparatus Incorporating Such Systems and/or Methods, filed Jun. 3, 2011, published as U.S. 2012/0306375, and assigned to the assignee of the present application.

Figure 2:
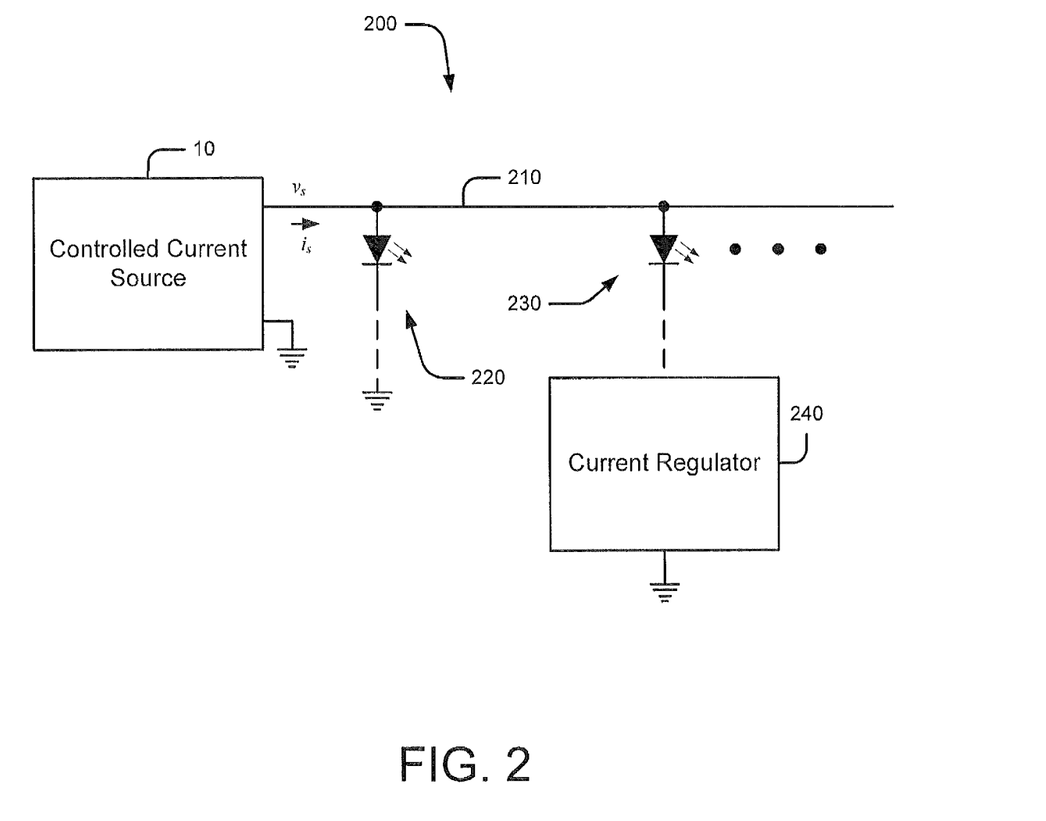
FIG. 2 is a schematic diagram illustrating lighting apparatus using an LED bus voltage regulator and a current-controlled secondary LED string for light output control according to further embodiments.

According to some embodiments, regulation of a bus coupled to a controlled current source may be provided by using at least one first LED, and light output (e.g., color) control may be provided by regulating current of at least one second LED coupled to the bus in parallel with the at least one first LED. For example, as shown in FIG. 2, a lighting apparatus 200 may include a bus 210 that is coupled to a terminal of controlled current source 10. At least one first LED 220 is coupled between the bus 210 and a ground node that provides a current return path to the controlled current source 10. The at least one first LED 220 regulates the voltage $v_s$ of the bus 210, as the at least one first LED 220 will vary the current passing therethrough to maintain a forward voltage across the at least one first LED 220 and, thus, the bus voltage $v_s$.

At least one second LED 230 is coupled to the bus 210. Current through the at least one second LED 220 is controlled by a current regulator circuit 240. The current regulator circuit 240 may be used, for example, to control a relationship between currents in the at least one first LED 220 and the at least one second LED 230 to control, for example, a color output of the lighting apparatus 200. It will be appreciated that the at least one first LED 220 and the at least one second LED 230 may comprise respective LED strings composed of different color-output LEDs, and that the current regulator circuit 240 generally may be used to control the relative outputs of these different component LEDs. Voltage regulation provided by the at least one first LED 220 compensates for variation in current through the at least one second LED 230, such that current drawn from the controlled current source 10 approximately matches the current set point of the controlled current source 10.

Figure 3:
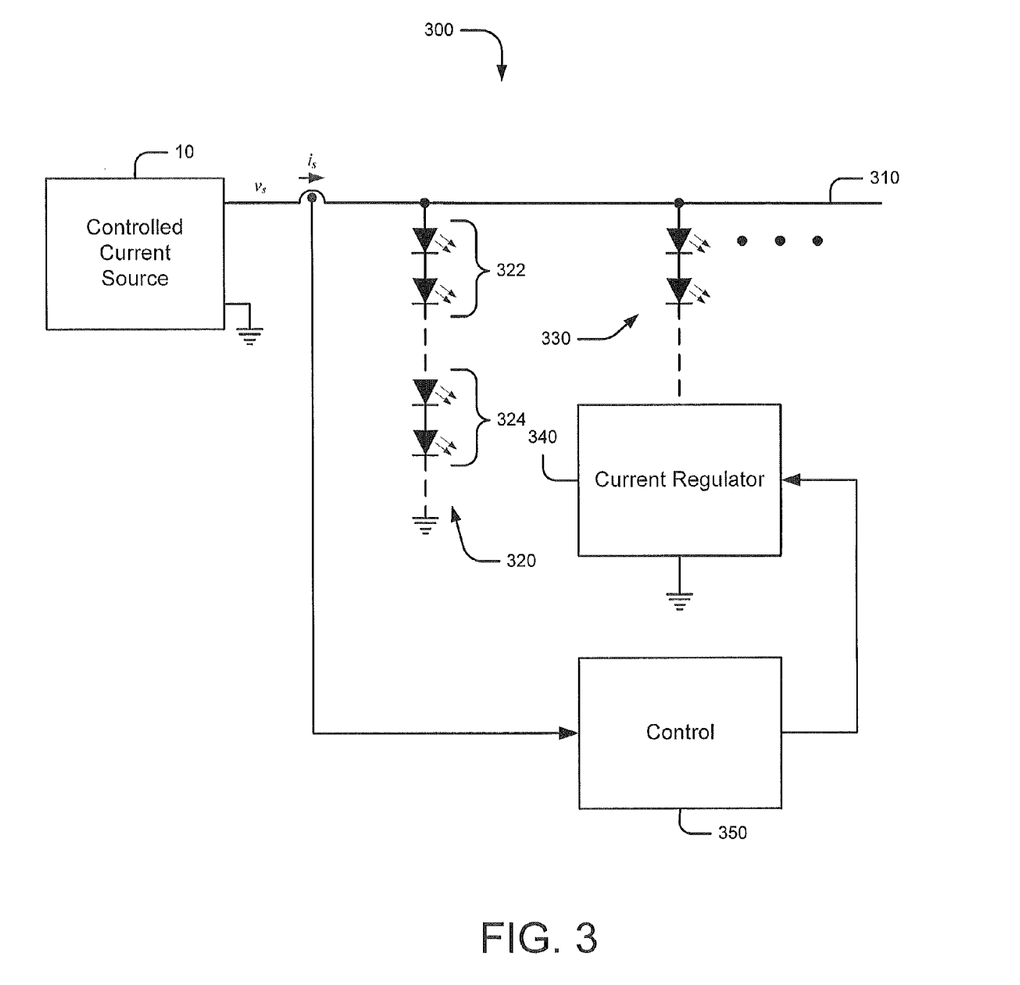
FIG. 3 is a schematic diagram illustrating a lighting apparatus using an LED string with different color components as a bus voltage regulator and a current-regulated secondary LED string for color control according to some embodiments.

FIG. 3 illustrates an example of how an arrangement along the lines of FIG. 2 may be used to implement color control that is dependent on the current output of a controlled current source. A lighting apparatus 300 includes a bus 310 coupled to a terminal of a controlled current source 10. A first LED string 320 is coupled to the bus 310 in parallel with the current source 10 and includes LEDs 322, 324 producing first and second colors. A second LED string 330 is coupled to the bus 310 in parallel with the first LED string 320, and current passing therethrough is controlled by a current regulator circuit 340. The second LED string 330 may include, for example, LEDs producing one of the first and second colors. A control circuit 350 provides a current control signal to the current regulator circuit 350 responsive to the output current $i_s$ produced by the controlled current source 10. Thus, for example, when the output current $i_s$ varies, the relative outputs of the first and second LED strings 320, 330 may be varied to produce a desired variation in color output. It will be appreciated that such techniques may also be combined with shunt control arrangements that selectively bypass selected LEDs in a string, such as selected ones of the first and second color LEDs 322, 324, in a manner similar to that described in the aforementioned U.S. 2012/0306375.

Figure 4:
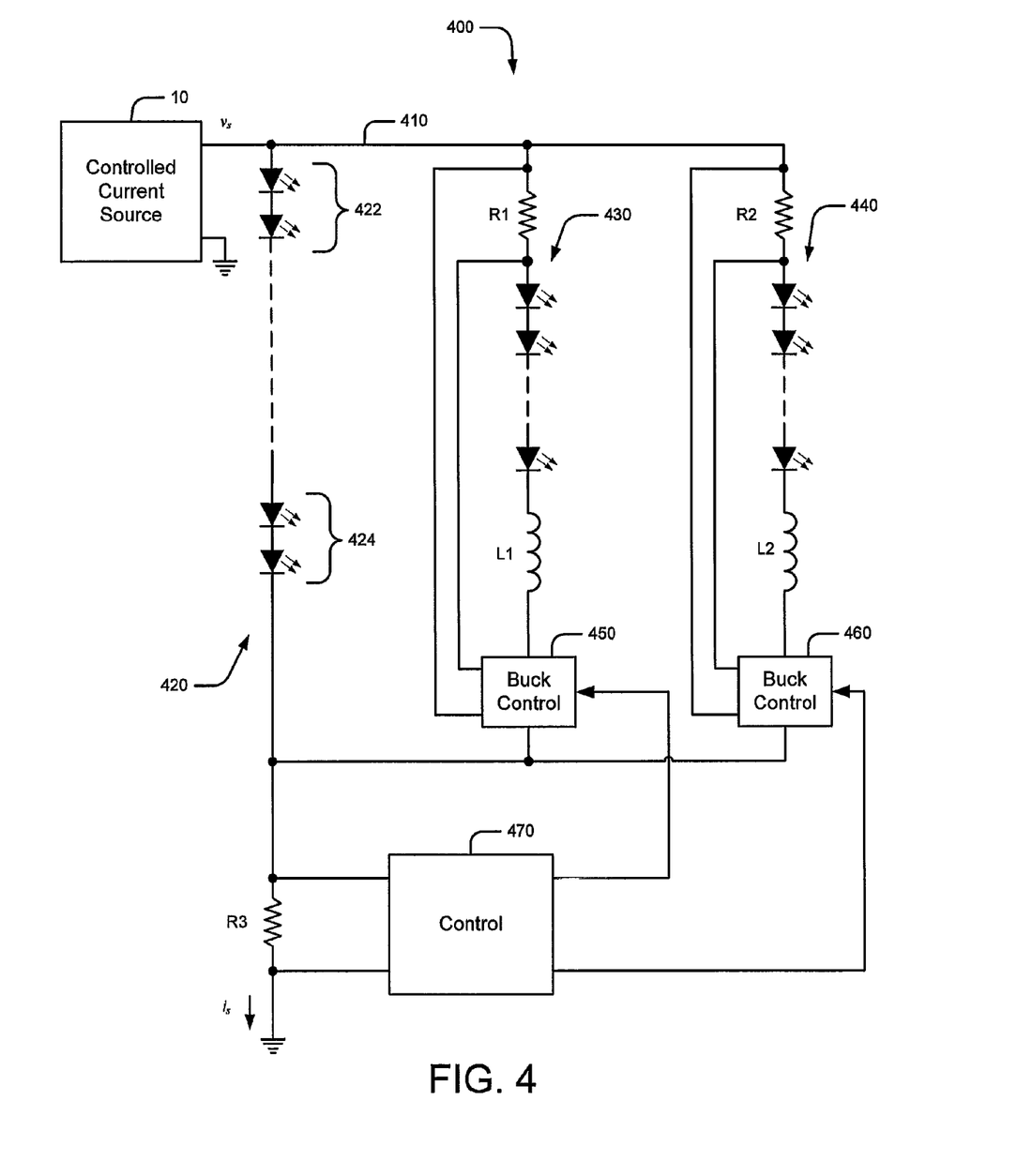
FIG. 4 is a schematic diagram illustrating a lighting apparatus providing input current dependent color control according to further embodiments.

FIG. 4 illustrates an exemplary implementation of such an apparatus. A lighting apparatus 400 includes a bus 410 coupled to a terminal of a controlled current source 10. A first fixed LED string 420 is coupled between the bus 410 and ground, in parallel with the controlled current source 10. Second and third LED strings 430, 440 are coupled to the bus 410 and currents therethrough are controlled by respective buck current regulator circuits including current sense resistors R1, R2, inductors L1, L2 and buck control circuits 450, 460. An example of a buck control circuit that may be used for the buck control circuits 450, 460 in some embodiments is the AL98807 Buck LED Driver distributed by Diodes Incorporated. A control circuit 470 controls the buck control circuits 450, 460, e.g., provides respective current set point commands to the buck control circuits 450, 460, responsive to a voltage generated across a current sense resistor R3 that is representative of the current $i_s$ provided to the LED strings 420, 430, 440 by the controlled current source 10.

As shown, the first LED string 420 includes first LEDs 422 and second LEDs 424 producing respective first and second colors. The first LEDs 422 and the second LEDs 424 may include, for example, red LEDs and blue-shifted yellow (BSY) LEDS, respectively. In some embodiments, the second and third LED strings 430, 440 may include LEDS of respective ones of the first and second colors. In some embodiments, the second LED string 430 and/or the third LED string 440 may include LEDs that produce different colors than the LEDs 422, 424 of the first LED string 420. For example, in some embodiments, the first and second LEDs 422, 424 of the first LED string 420 may be red LEDs and BSY LEDs, respectively. The second LED string 430 may include red LEDs. The third LED string 440 may include BSY LEDs having a different color point than the BSY LEDs of the first LED string 420.

It will be appreciated that, although the embodiments of FIG. 4 include two current-controlled LED strings 430, 440 in combination with a fixed LED string 420, different numbers of fixed and/or current-controlled strings may be used in other embodiments. It will be further appreciated that, generally, the color composition of such LED strings may be varied to provide different performance characteristics. Although the apparatus 400 of FIG. 4 uses buck regulators for current control, it will be appreciated that some embodiments may use other types of current control circuitry. It will be appreciated that the control circuit 470 may include analog and/or digital circuitry. For example, in some embodiments, the control circuit 470 may include a digital processor, such as a microcontroller or microprocessor, along with analog and/or digital circuitry (e.g., buffer and/or driver circuitry) for interfacing such a processor to other components of the apparatus 400.

Figure 5:
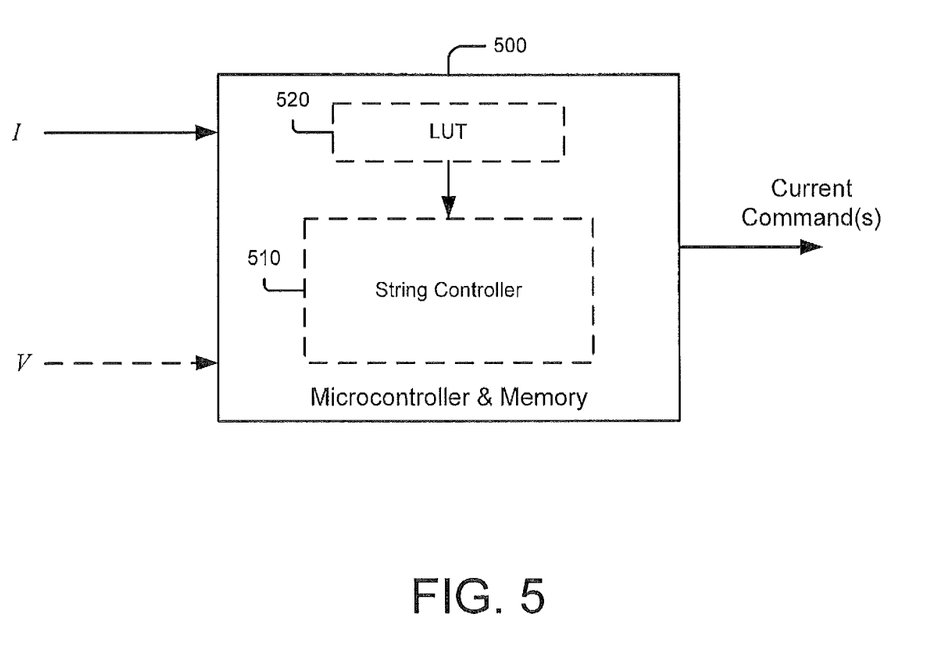
FIG. 5 is a schematic diagram illustrating control circuitry for the lighting apparatus of FIG. 4.

FIG. 5 illustrates an exemplary implementation of the control circuit 470 of FIG. 4 according to some embodiments. Referring to FIG. 5 in conjunction with FIG. 4, a processor and associated memory 500 (e.g., a microprocessor or microcontroller with integrated and/or external memory) may be configured to execute program code that implements a string controller 510 that generates one or more current control commands for controlling one or more current regulators (e.g., current set point inputs for the buck control circuits 450, 460) responsive to a current sense signal I indicative of a current supplied by the controlled current source 10. For example, to provide color control of the apparatus 400, the processor and memory 500 may be configured to implement a look up table (LUT) 520 that correlates the source current signal I with current command signals that control the buck control circuits 450, 460 associated with the current-controlled LED strings 430, 440. The LUT 520 may be designed to support variation of the color output of the lighting apparatus for different source current levels such that, for example, the light output of the apparatus 400 approximately tracks a black body locus as a dimming input is applied to the current source 10. The string controller 510 may also be configured to act in response to other inputs, such as a signal V indicative of a voltage of the bus 410. For example, the string controller 510 may shut off current flow through the controlled LED strings 430, 440 if the voltage signal V indicates the voltage at the bus 410 is insufficient to forward bias the first LED string 420.

It will be appreciated that the arrangement shown in FIG. 5 is provided for purposes of illustration, and that other techniques than look up tables may be used, such as techniques that use polynomials or other formulas to relate the source current signal I to one or more LED string current command signals. It will be further appreciated that other digital and/or analog circuitry could be used to provide similar effects.

Figure 6:
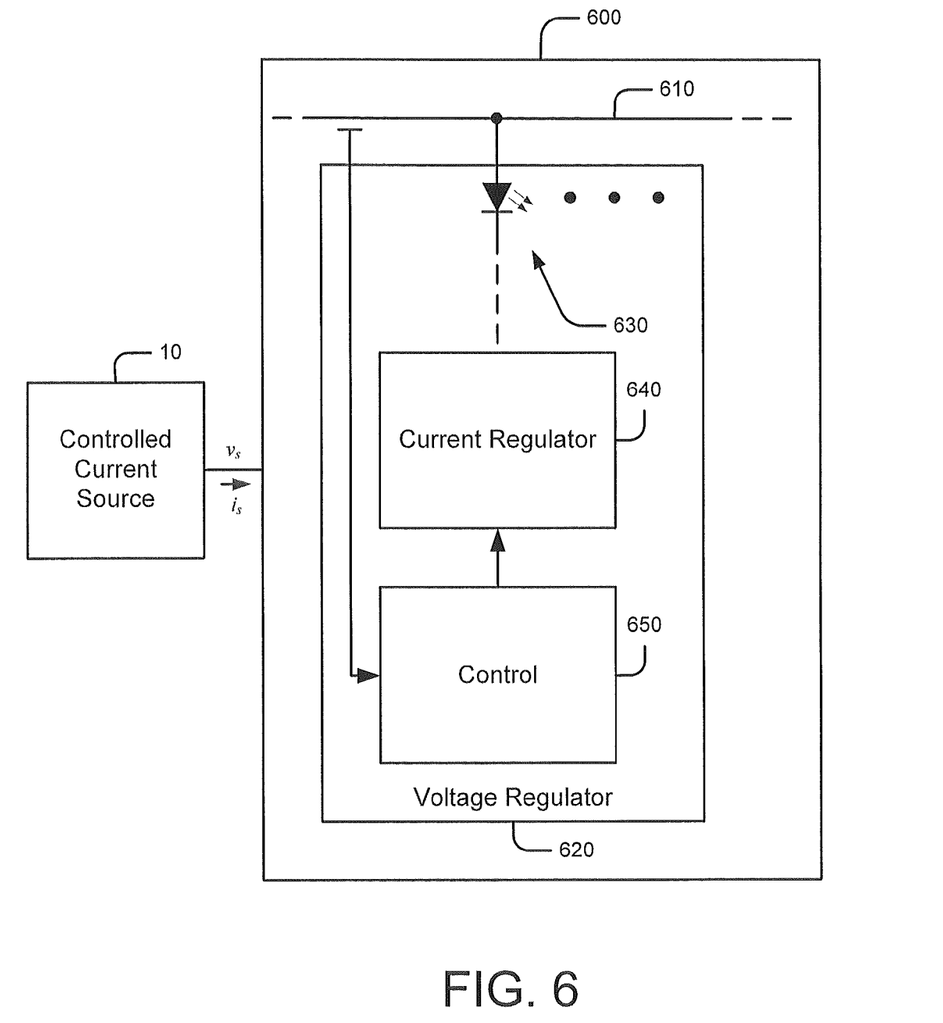
FIG. 6 is a schematic diagram illustrating a lighting apparatus using a current-controlled light emitting device for bus voltage regulation according to some embodiments.

According to further embodiments, current regulated LED strings may be used to regulate a voltage produced by a controlled current source. Referring to FIG. 6, a lighting apparatus 600 includes a bus 610 configured to be directly or indirectly coupled to a controlled current power source 10 to receive power therefrom. The apparatus 600 further includes a voltage regulator circuit 620 including at least one LED 630 coupled to the bus 610 and a current regulator circuit 640 configured to control current through the at least one LED 630, along with a control circuit 650 that controls the current regulator circuit 640 responsive to a signal indicative of a voltage of the bus 610. The control circuit 650 may, for example, change a set point of the current regulator circuit 640 in response to a change of the bus voltage, such that the bus voltage may be maintained at a desired level.

Figure 7:
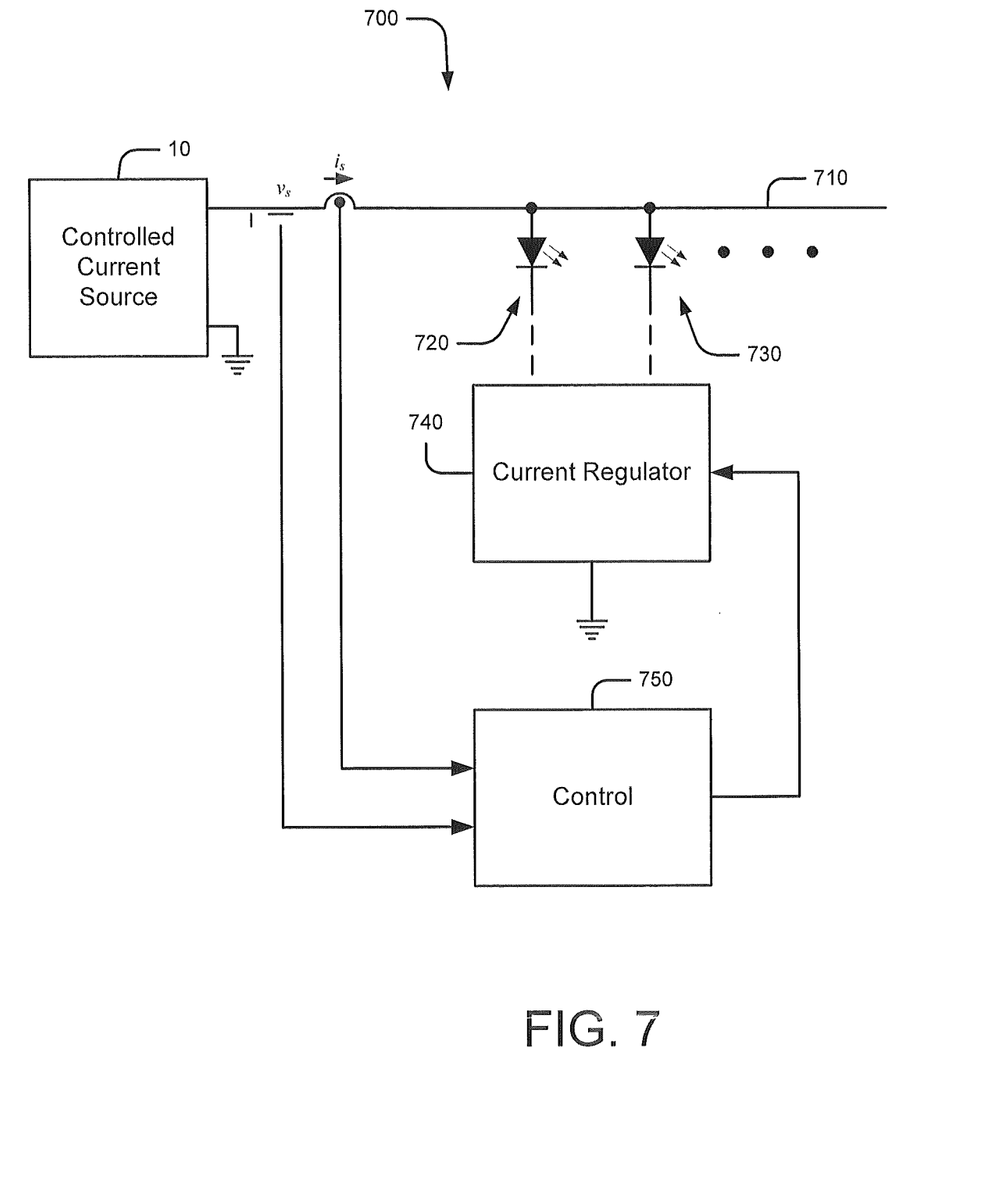
FIG. 7 is a schematic diagram illustrating a lighting apparatus using multiple current-controlled LED strings for bus voltage regulation and input current dependent color control according to further embodiments.

Circuitry along these lines may be used to implement color control according to further embodiments. Referring to FIG. 7, a lighting apparatus 700 includes a bus 710 coupled to a controlled current source 10. A least one first LED 720 and at least one second LED 730 are configured to be coupled in parallel to the bus 710, with a current regulator circuit 740 controlling respective currents through the at least one first LED 720 and the at least one second LED 730. A control circuit 750 controls the current regulator circuit 700 responsive to a current $i_s$ provided to the bus 710 by the controlled current source 10 and to a signal indicative of a voltage of the bus 710. The control circuit 750 may be configured to provide regulation of the currents through the at least one first LED 720 and the at least one second LED 710 to provide a desired color output for the apparatus 700 while approximately matching the current set point of the controlled current source 10.

Figure 8:
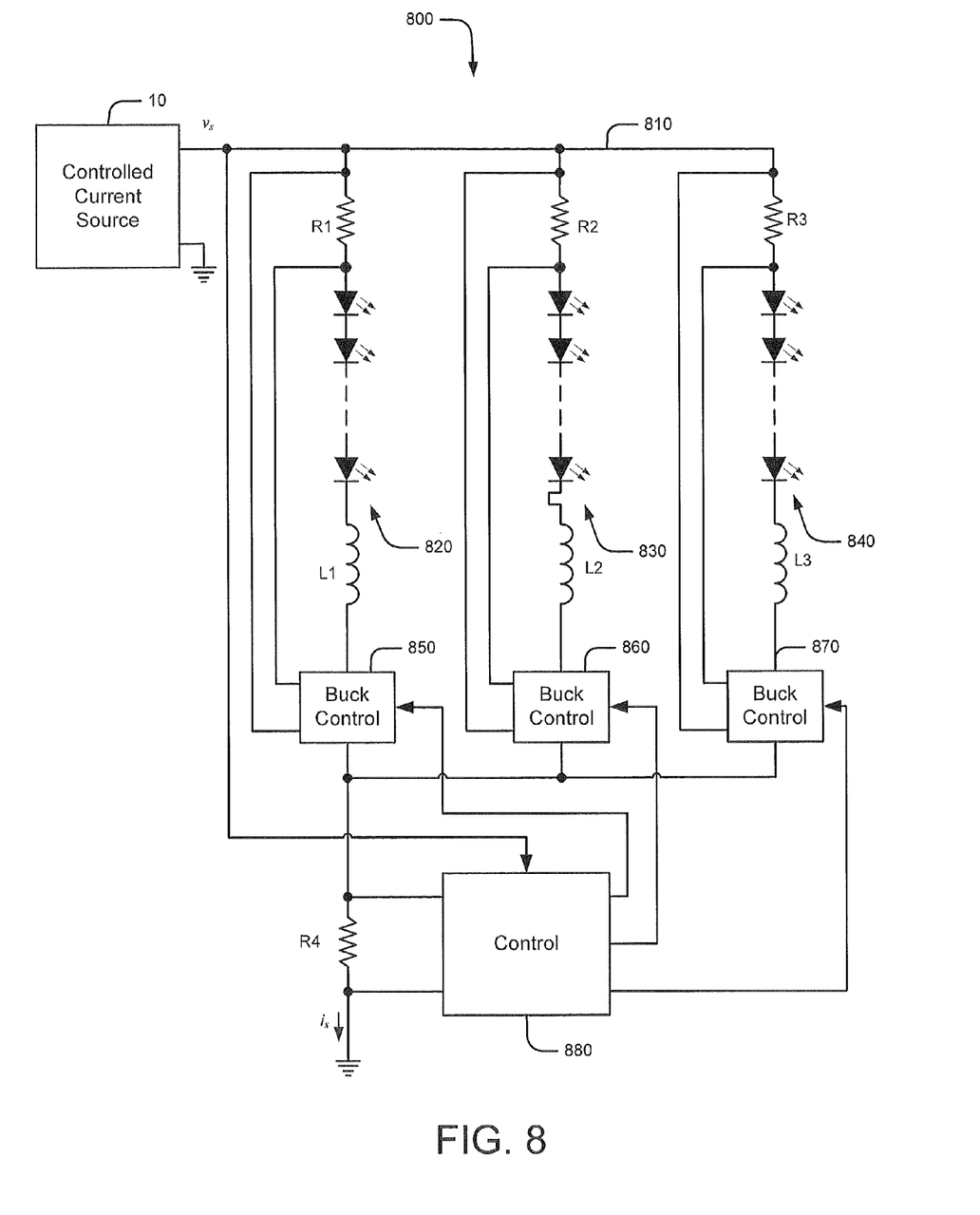
FIG. 8 is a schematic diagram illustrating a lighting apparatus using multiple current-controlled strings with different color compositions for current-dependent color control according to further embodiments.
Figure 9:
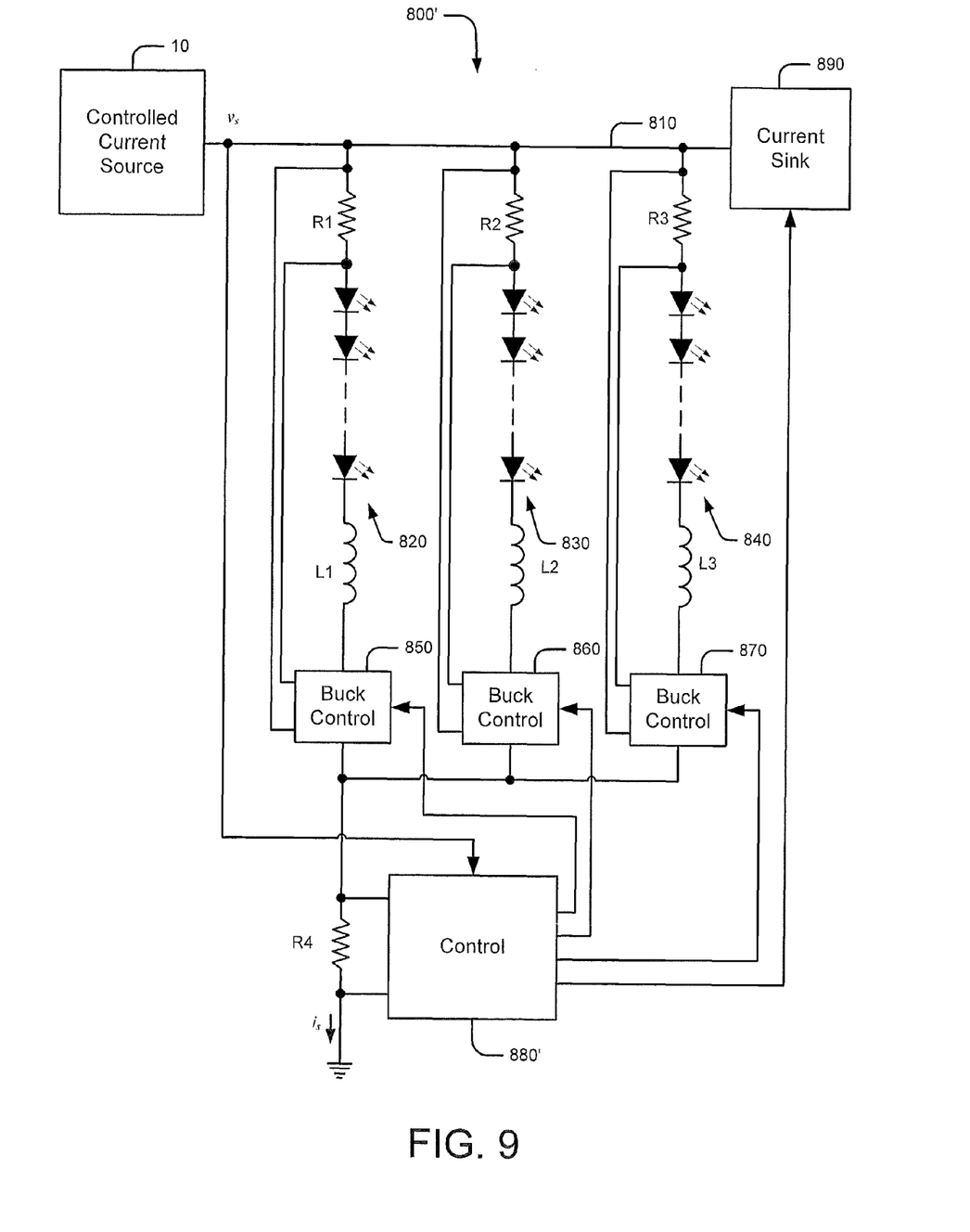
FIG. 9 is a schematic diagram illustrating a lighting apparatus using multiple current-controlled strings with different color compositions and an ancillary current sink for current-dependent color control according to still further embodiments.

FIG. 8 illustrates an exemplary implementation of a lighting apparatus along the lines illustrated in FIG. 6. A lighting apparatus 800 includes a bus 810 configured to be coupled to a controlled current source 10. First, second and third strings of LEDs 820, 830, 840 are coupled to the bus 810 and are controlled by respective buck current regulator circuits comprising current sense resistors R1, R2, R3, inductors L1, L2, L3 and buck control circuits 850, 860, 870. A control circuit 880 controls (e.g., provides current set point commands to) the buck control circuits 850, 860, 870 responsive to a voltage of the bus 810 and a voltage representative of the current $i_s$ provided to the LED strings 820, 830, 840 developed across a current sense resistor R4. FIG. 9 illustrates an apparatus 800' similar to the apparatus 800 of FIG. 8, with the addition of a current sink circuit 890 controlled by a control circuit 880' that also controls the buck control circuits 850, 860, 870. The current sink circuit 890 may include, for example, a load, such as a resistor, diode, or the like, which may be selectively coupled to the bus 810 using a switch (e.g., a transistor) controlled by the control circuit 880'. In some embodiments, it may or may not be necessary to monitor individual currents through the buck-controlled strings.

Figure 10:
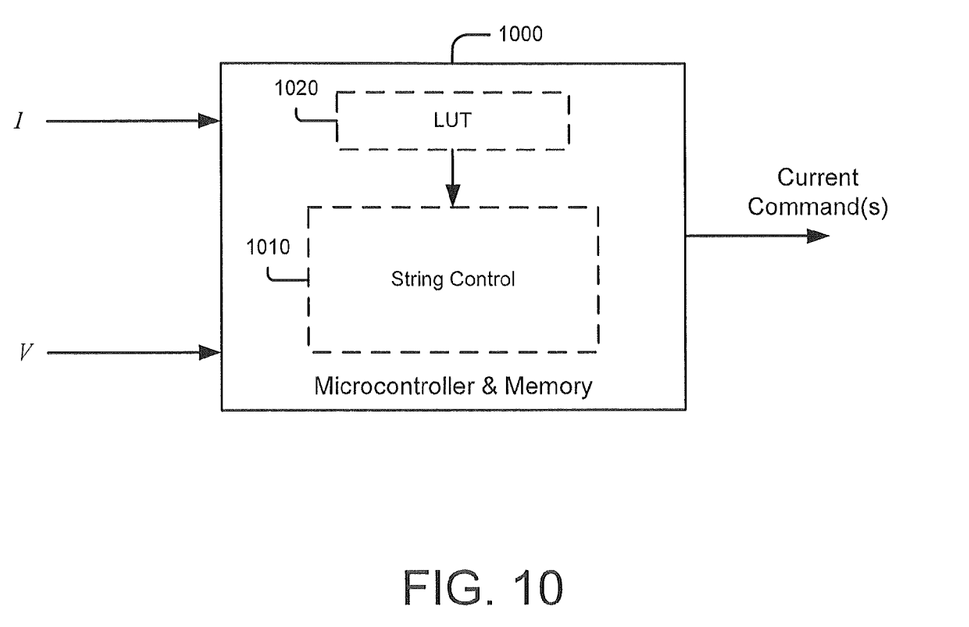
FIG. 10 is a schematic diagram illustrating control circuitry for the lighting apparatus of FIGS. 8 and 9.

FIG. 10 illustrates an exemplary implementation of the control circuits 880, 880' of FIGS. 8 and 9 according to some embodiments. Referring to FIGS. 8 and 9 in conjunction with FIG. 10, a processor and associated memory 1000 (e.g., a microprocessor or microcontroller with integrated and/or external memory) may be configured to execute program code that implements a string controller 1010 that generates one or more current control commands for controlling one or more current regulators (e.g., current set point inputs for the buck control circuits 850, 860, 870 and the current sink circuit 890) responsive to a current sense signal I indicative of a current supplied by the controlled current source 10 and a voltage sense signal V indicative of a voltage of the bus 810. For example, to provide color control of the apparatus 800, 800', the processor and memory 1000 may be configured to implement a look up table (LUT) 1020 that correlates the source current signal I and the voltage sense signal V with current command signals that control the buck control circuits 850, 860, 870 and the current sink circuit 890. The LUT 1020 may be designed to support variation of the color output of the lighting apparatus for different source current levels such that, for example, the light output of the apparatus 800, 800' approximately tracks a black body locus as a dimming input is applied to the current source 10. The string controller 1010 may also be configured perform other actions in response to the input signals, such as shutting off current flow through the controlled LED strings 820, 830, 840 if the voltage signal V indicates the voltage at the bus 810 is insufficient to forward bias one or more of the LED strings 820, 830, 840.

Figure 11:
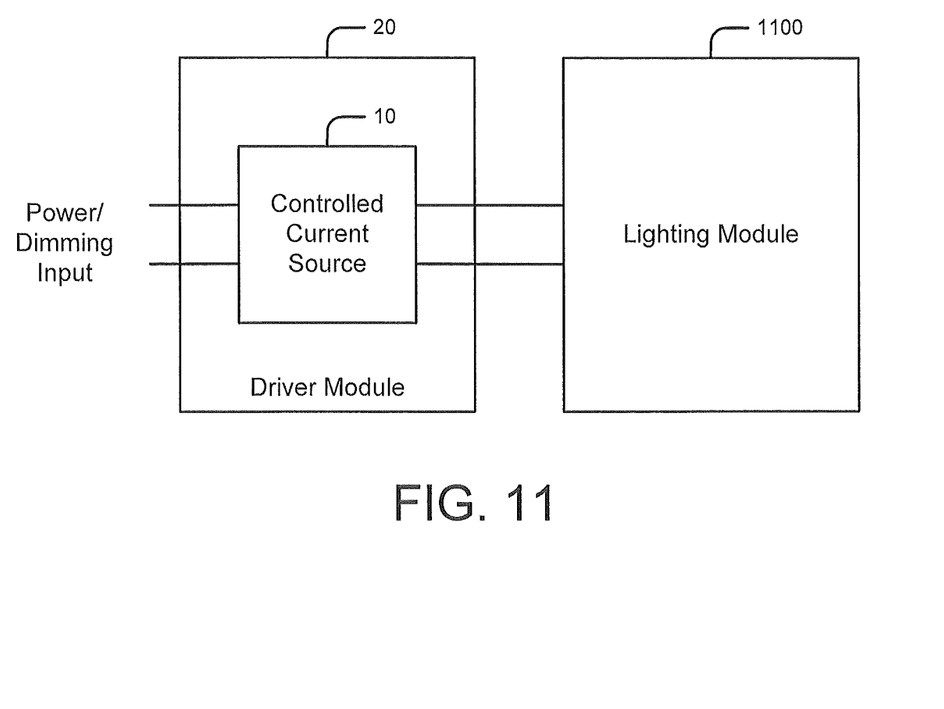
FIG. 11 is a schematic diagram illustrating a modular lighting component arrangement according to some embodiments.

Some embodiments of the inventive subject matter may be advantageously used in modular lighting apparatus. For example, FIG. 11 illustrates a modular configuration in which a driver module 20 including a controlled current source 10 is configured to be coupled to a separate lighting module 1100. The lighting module 1100 may incorporate embodiments of the inventive subject matter, such as the circuitry described above with reference to FIGS. 1-10.

Figure 12:
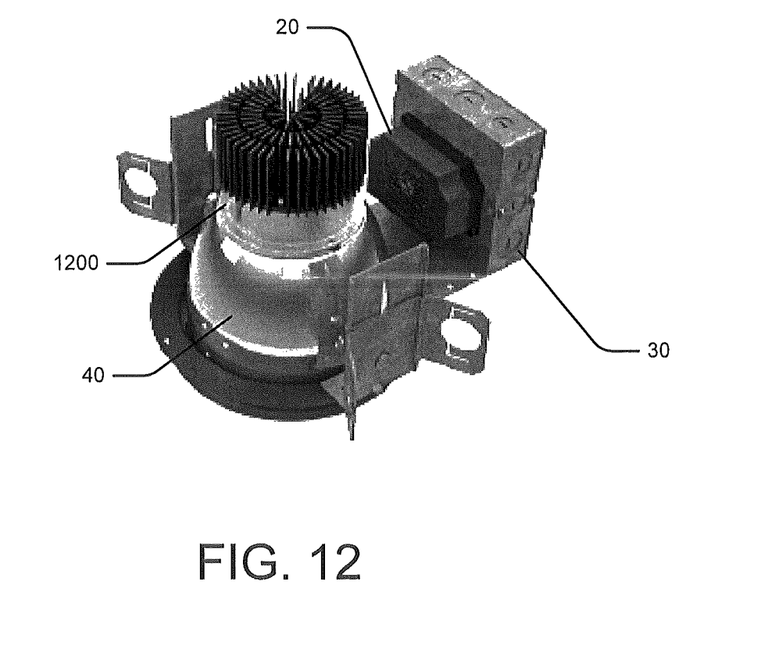
FIG. 12 is a perspective view of a lighting fixture employing modular components along the lines illustrated in FIG. 11.

FIG. 12 illustrates an example of such a modular arrangement in a recessed lighting fixture. The fixture includes a lighting module 1200 mounted on a reflector structure 40 and coupled to a driver module 20. The lighting module 1200 may incorporate embodiments of the inventive subject matter, such as the circuitry describe above with reference to FIGS. 1-10. It will be appreciated that such modular arrangements may be used in other applications, such as in surface-mounted fixtures, table lamps, task lights, track lighting fixtures, pendant lighting fixtures, and the like.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. An apparatus comprising:
   a bus configured to be coupled to a controlled current source that produces a regulated output current;
   at least one light emitting device coupled to the bus;
   a voltage regulator circuit configured to regulate a voltage at the bus; and
   a current regulator circuit configured to control a current through the at least one light emitting device,
   wherein the voltage regulator circuit comprises at least one string of LEDs coupled to the bus.

2. The apparatus of claim 1, wherein the voltage regulator circuit is configured to control the current regulator circuit to support regulation of the voltage at the bus.

3. The apparatus of claim 2, wherein the voltage regulator circuit comprises a current sink circuit coupled to the bus.

4. The apparatus of claim 2, wherein the current regulator circuit comprises a buck current regulator.

5. The apparatus of claim 1, wherein the current regulator circuit is configured to control the current through the at least one light emitting device responsive to the regulated output current of the controlled current source to vary a color of a lighting output of the apparatus as the current through the at least one light emitting device changes.

6. The apparatus of claim 1, wherein the at least one light emitting device comprises first and second strings of LEDs configured to be coupled to the bus.

7. An apparatus comprising:
   a bus configured to be coupled to a controlled current source that produces a regulated output current;
   a voltage regulator circuit comprising at least one first LED coupled to the bus and configured to conduct a first current from the bus;
   a least one second LED coupled to the bus and configured to conduct a second current from the bus; and
   a current regulator circuit configured to control the second current through the at least one second LED.

8. The apparatus of claim 7, wherein the current regulator circuit is configured to control the second current through the at least one second LED responsive to a level of the regulated output current of the controlled current source.

9. The apparatus of claim 8, wherein the current regulator circuit is configured to vary a color of a light output of the apparatus as the regulated output current of the controlled current source varies.

10. The apparatus of claim 7, wherein the current regulator circuit comprises a buck current regulator.

11. The apparatus of claim 7, wherein the at least one first LED comprises at least one LED configured to produce a first color and at least one LED configured to produce a second color and wherein the at least one second LED comprises at least one LED configured to produce one of the first and second colors.

12. The apparatus of claim 11, wherein the first color comprises blue shifted yellow and wherein the second color comprises red.

13. The apparatus of claim 7, wherein the at least one first LED comprises a string of LEDs.

14. The apparatus of claim 13, wherein the at least one second LED comprises a string of LEDs.

15. The apparatus of claim 7, further comprising at least one third LED coupled to the bus and wherein the current regulator circuit is configured to individually control currents through respective ones of the at least one second LED and the at least one third LED.

16. The apparatus of claim 15, wherein the current regulator circuit comprises respective buck current regulators configured to control respective currents through the at least one second LED and the at least one third LED.

17. The apparatus of claim 15, wherein the at least one first LED comprises at least one LED configured to produce a first color and at least one LED configured to produce a second color, wherein the at least one second LED comprises at least one LED configured to produce the first color and wherein the at least one third LED comprises at least one LED configured to produce the second color.

18. The apparatus of claim 17, wherein the first color comprises blue-shifted yellow and wherein the second color comprises red.

19. An apparatus comprising:
   a bus configured to be coupled to a controlled current source that produces a regulated output current;
   at least one light emitting device coupled to the bus; and
   a voltage regulator circuit configured to regulate a voltage at the bus,
   wherein the voltage regulator circuit comprises at least one LED coupled to the bus.

20. The apparatus of claim 19, wherein the voltage regulator circuit comprises a current regulator circuit configured to regulate a current through the at least one light emitting device.

* * * * *

UNITED STATES PATENT AND TRADEMARK OFFICE
CERTIFICATE OF CORRECTION

PATENT NO.         : 9,648,695 B2
APPLICATION NO.    : 13/955689
DATED              : May 9, 2017
INVENTOR(S)        : Shawn Hill and Everett Bradford It is certified that error appears in the above-identified patent and that said Letters Patent is hereby corrected as shown below:

In the Claims

In Column 10, Line 35, Claim 12, delete "blue shifted yellow", and insert -- blue-shifted yellow --, therefor.

Signed and Sealed this
Twenty-fourth Day of April, 2018

Andrei Iancu
*Director of the United States Patent and Trademark Office*